United States Patent
Tang et al.

(10) Patent No.: US 12,417,062 B2
(45) Date of Patent: Sep. 16, 2025

(54) METHOD AND DEVICE FOR LINKAGE TRANSMISSION, AND COMPUTER-READABLE STORAGE MEDIUM

(71) Applicant: GUANGDONG COROS SPORTS TECHNOLOGY CO., LTD, Dongguan (CN)

(72) Inventors: Yu Tang, Dongguan (CN); Chao Li, Dongguan (CN)

(73) Assignee: GUANGDONG COROS SPORTS TECHNOLOGY CO., LTD, Dongguan (CN)

( * ) Notice: Subject to any disclaimer, the term of this patent is extended or adjusted under 35 U.S.C. 154(b) by 0 days.

(21) Appl. No.: 18/775,094

(22) Filed: Jul. 17, 2024

(65) Prior Publication Data

US 2025/0028495 A1   Jan. 23, 2025

(30) Foreign Application Priority Data

Jul. 20, 2023 (CN) .......................... 202310900862.9

(51) Int. Cl.
   *G06F 3/14*   (2006.01)
   *G06F 1/16*   (2006.01)
   *G06T 11/60*  (2006.01)

(52) U.S. Cl.
   CPC ............ *G06F 3/1423* (2013.01); *G06F 1/163* (2013.01); *G06T 11/60* (2013.01)

(58) Field of Classification Search
   CPC ...... G06F 3/1423; G06F 1/163; G06F 1/3278; G06F 3/011; G06T 11/60
   See application file for complete search history.

(56) References Cited

U.S. PATENT DOCUMENTS

2014/0073481 A1\* 3/2014 Aibara ............... A63B 24/0084
                                                      482/1

FOREIGN PATENT DOCUMENTS

CN          113633278 A       11/2021

OTHER PUBLICATIONS

Extended European Search Report to corresponding EP Appln. No. 24189791.7, mailed Dec. 2, 2024 (8 pages).

\* cited by examiner

*Primary Examiner* — Matthew A Eason
*Assistant Examiner* — Chayce R Bibbee
(74) *Attorney, Agent, or Firm* — Nicholas Martin; Greenberg Traurig, LLP

(57) ABSTRACT

The present application provides a method and a device for linkage transmission, and a computer-readable storage medium, which makes it more convenient and safer for users to view real-time motion data. The method is applied to a terminal system, the terminal system includes a first terminal and a second terminal, the first terminal includes a wearable device, and the second terminal includes a display device. The method includes steps of: obtaining real-time motion data; controlling the first terminal to send the obtained real-time motion data; and controlling the second terminal to display the real-time motion data on a display device.

16 Claims, 2 Drawing Sheets

METHOD AND DEVICE FOR LINKAGE TRANSMISSION, AND COMPUTER-READABLE STORAGE MEDIUM

CROSS-REFERENCE TO RELATED APPLICATION

Pursuant to 35 U.S.C. § 119 and the Paris Convention, this application claims the benefit of Chinese Patent Application No. 202310900862.9 filed on Jul. 20, 2023, the content of which is incorporated herein by reference.

TECHNICAL FIELD

The present application relates to the field of electronic technology, and in particular, to a method and a device for linkage transmission, and a computer-readable storage medium.

BACKGROUND

The statements provided herein are merely background information related to the present application, and do not necessarily constitute any prior arts. In real life, wearable devices are increasingly used. Through wearable devices, users can record exercise, sleep, diet and other data in daily life, and share these data with other terminals to guide the establishment of a healthy life through these data.

However, in current exercise scenes, additional operations are often required to view real-time motion data obtained from a wearable device. For example, in case that a smart bracelet is used for exercise recording, a user may need to raise her/his wrist to view the smart bracelet when running, or to lift her/his hand on which the smart bracelet is worn, off a handlebar for viewing when riding. Not only are the observation steps troublesome, but these observation steps may even pose a security threat.

SUMMARY

The present application provides a method and a device for linkage transmission, and a computer-readable storage medium, which makes it more convenient and safer for users to view real-time motion data.

In accordance with a first aspect of the present application, a method for linkage transmission is provided, which is applied to a terminal system. The terminal system includes a first terminal and a second terminal, the first terminal includes a wearable device, and the second terminal includes a display device. The method includes steps of: obtaining real-time motion data; controlling the first terminal to send the obtained real-time motion data; and controlling the second terminal to display the real-time motion data on the display device. The second terminal is different from the first terminal.

In accordance with a second aspect of the present application a device for linkage transmission is provided, which includes a component for performing any one of the methods in the first aspect. The device may be a piece of terminal equipment or a chip in the terminal equipment. The device may include an obtaining component and a first processor.

When the device is the terminal equipment, the first processor may be a processor, and the obtaining component may be a touch screen, a microphone or other input device. The terminal equipment may also include a memory, the memory is configured to store a computer program, and the processor, when executing the computer program stored in the memory, is configured to cause the terminal equipment to perform any one of the methods in the first aspect.

When the device is the chip in the terminal equipment, the first processor may be a data handling component inside the chip, and the obtaining component may be an input/output interface, a pin or a circuit, etc. The chip may also include a memory, which may be a memory inside the chip (e.g., a register, a cache, etc.) or a memory located outside the chip (e.g., a read-only memory, a random-access memory, etc.). The memory is configured to store a computer program, and the processor, when executing the computer program stored in the memory, is configured to cause the chip to perform any one of the methods in the first aspect.

In accordance with a third aspect, a computer-readable storage medium is provided, in which a computer program is stored, and the computer program, when executed by the above-mentioned device, enables the device to perform any one of the methods in the first aspect.

DETAILED DESCRIPTION OF EMBODIMENTS

Figure 1:
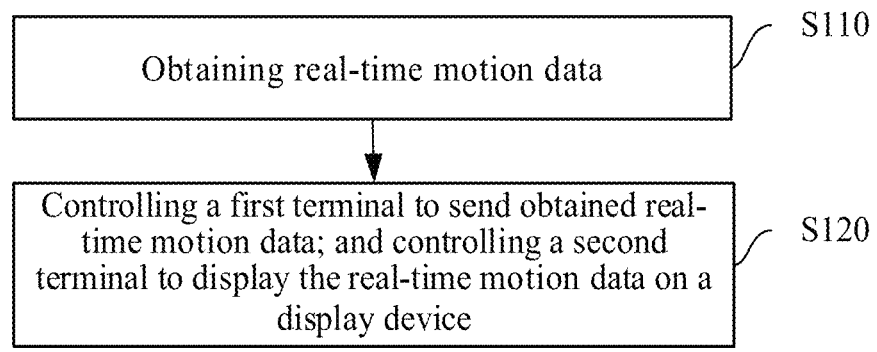
FIG. 1 is a flow chart of a method for linkage transmission provided by the present application.

In the following description, for the purpose of illustration rather than limitation, specific details such as specific system structures and technologies are proposed so as to thoroughly understand the embodiments of the present application. However, it should be clear to persons skilled in the art that the present application may also be implemented in other embodiments without these specific details. In other cases, detailed descriptions of well-known systems, equipment, circuits and methods are omitted to avoid unnecessary details that hinder the description of the present application.

It should be understood that when used in the specification and the attached claims of the present application, the term "including" indicates the presence of the described features, wholes, steps, operations, elements and/or components, but does not exclude the presence or addition of one or more other features, wholes, steps, operations, elements, components and/or any combinations thereof.

It should also be understood that the term "and/or" used in the specification and the attached claims of the present application refers to any combination of one or more of the associated listed items as well as all possible combinations, and includes these combinations.

With the development of science and technology, in current life, the application scenarios and functions of wearable devices are becoming more and more extensive, and people often need to use different functions in different scenes, such as using smart bracelets or smart watches to record health data when exercising outdoors, using smart bracelets or smart watches to receive information reminders when working in the office, etc. However, for some scenes, such as cycling, treadmill, rowing machine, elliptical machine and other exercise scenes, it is not convenient for users to raise their wrists to view a display interface of the wearable device. On the one hand, the exercise process will be interrupted, such as when rowing, the user needs to pause the hand movement and raise her/his wrist to view; on the other hand, safety hazards may be occurred. For example, when riding outdoors, a rider's attention will be diverted if the rider raises his/her wrist to view the motion data which may cause traffic accidents. Thus, it is necessary to provide a safer and more convenient way to view data.

The present application provides a method for displaying the data that users are concerned about through a screen that is more convenient for viewing, which brings a more humane user experience for the need to view the motion data.

Technical schemes in the present application will be described below in conjunction with the drawings.

It should be noted that in the description of the specification and the attached claims of the present application, the terms "first", "second", "third", etc. are used only to distinguish different individuals in the same type of object, and cannot be understood as indicating or implying relative importance. For example, the first terminal and the second terminal represent two different pieces of terminal equipment, and there is no other limitation.

Figure 2:
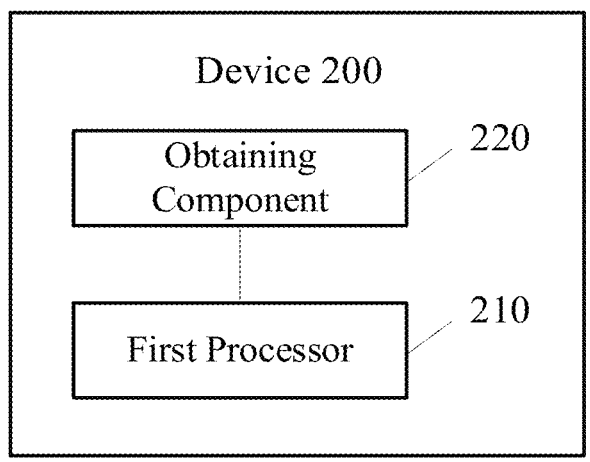
FIG. 2 is a schematic diagram of a device for linkage transmission provided by the present application.

The method 100 for linkage transmission may be performed by the device shown in FIG. 2. The following contents are provided for the method 100 as shown in FIG. 1. The method is applied to a terminal system. The terminal system includes a first terminal and a second terminal, the first terminal includes a wearable device, and the second terminal includes a display device. The method includes steps S110 and S120.

In step S110, real-time motion data is obtained.

Particularly, the method for linkage transmission provided in the present application is mainly used to display the real-time motion data for a user, and it is required to obtain the real-time motion data and display the same on a display device provided in the present application for the user to view on demand.

Optionally, the method also includes steps of: obtaining a motion mode selection operation of a user, and controlling the first terminal to enter a motion mode according to the motion mode selection operation. The step of obtaining the real-time motion data includes: obtaining the real-time motion data upon detecting that the first terminal is entered the motion mode.

Particularly, the first terminal is, for example, a smart bracelet. In one example, the motion mode may be entered by the user through a button or gesture recognition function on the smart bracelet. If it is detected that the motion mode is entered by the user, then the smart bracelet starts to record relevant motion data. In another example, the first terminal may also be controlled by the user to contact a near field communication (NFC) tag to enable the first terminal to enter the motion mode and trigger a collection of the real-time motion data.

In some examples, the first terminal supports a user operation to enter a specific motion mode, the specific motion mode is a motion mode in which it is inconvenient to raise the wrist to view real-time motion information during movement, such as, a skipping mode, a rowing machine mode, a treadmill mode, etc. Different specific motion modes may require different parts of the real-time motion data to be collected, such as a counting of skipping times is required in the skipping mode, a recording of the running distance is required in the running mode, etc. After the specific motion mode is determined by the user, the real-time motion data can be collected in a targeted manner to improve the accuracy of data collection.

In this embodiment, a trigger condition for entering the motion mode is an active selection of the user, and the real-time motion data will be collected only after entering the motion mode. If the user does not choose to enter the motion mode, then user data will not be actively collected, which can save the power consumption of the first terminal.

In some examples, the step of obtaining the real-time motion data may also be triggered by the user's physiological data. For example, when it is detected by the first terminal that a heart rate of the user wearing the device reaches an exercise heart rate range, then the motion mode is automatically triggered by the first terminal and an obtaining of the real-time motion data starts.

In this embodiment, the step of obtaining the real-time motion data is enabled to be more intelligent, the number of user's operation steps is reduced, and the real-time motion data can be collected in a timely manner.

In step S120, the first terminal is controlled to send the obtained real-time motion data; and the second terminal is controlled to display the real-time motion data on the display device. The second terminal is different from the first terminal.

In this embodiment, the first terminal is mainly configured to collect real-time motion data of a wearer, and needs to have the function of collecting real-time motion data. The second terminal is mainly configured to display the real-time motion data, and needs to have a display device that is convenient for viewing. In addition, it is required to establishing a data transmission between the first terminal and the second terminal. For example, the first terminal is a wrist wearable device (smart bracelet, smart watch), a leg wearable device, a head wearable device, etc. The second terminal is a smart phone or other display device with communication function, etc.

When displaying the real-time motion data, the display device is located at a position where the user can easily observe the displayed data. For example, during exercise on a treadmill, the display device may be fixed on a display screen position of the treadmill itself; or may be arranged on a wall facing the treadmill, etc., for the convenience of user viewing.

It can be understood that the first terminal and the second terminal may be equipment of the same type, for example, both the first and second terminal are smart bracelets, and the user may observe the real-time motion data through the display screen of the smart bracelet as the second terminal, where the real-time motion data is collected and sent by the smart bracelet as the first terminal. In addition, the first terminal and the second terminal may also be equipment of different types, for example, the first terminal is a smart bracelet and the second terminal is a smart phone. Since a display area of a smart phone is usually larger than that of a smart bracelet, the user's viewing experience will be better.

In one example, before the real-time motion data sent by the first terminal to the second terminal, a trust relationship between the first terminal and the second terminal may be established and/or a connection status between the first terminal and the second terminal may be determined based on actual needs.

On the one hand, to establish a trust relationship, the first terminal and the second terminal that need to perform real-time motion data transmission may be bound via an account to verify that the equipment are trusted, and then data communication can be carried out between the two trusted equipment without inquiry.

Particularly, the user needs to create an account on the first terminal and the second terminal respectively, and bind the two accounts in the terminal system so that the two pieces of terminal equipment are trusted. During a binding process, the terminal system will require the user to enter some personal information (such as user name/account name, password, etc.), and encrypt this information to ensure the user's security. In the meantime, the terminal system will also generate a unique identification code to distinguish different users and different pieces of terminal equipment.

After completing the account binding, the first terminal and the second terminal will autonomously establish a Bluetooth connection and automatically perform trust verification. During the trust verification process, the first terminal and the second terminal will verify each other's identity and authority to ensure the security and reliability of data communication. If the trust verification is successful, the data communication can begin between the first terminal and the second terminal. In some cases, when the first terminal has data to be transmitted, the first terminal may autonomously send the data to the second terminal, and data transmission will be stopped only after a response from the second terminal is received by the first terminal.

By establishing the trust relationship, it can be ensured that the data communication between the first terminal and the second terminal is safe and reliable. Only trusted equipment can communicate data, which enhances the security and stability of the system.

On the other hand, it may be confirmed first whether a connection has been established between the terminal equipment. If the connection has not been established, then a connection between the first terminal and the second terminal is established; if the connection has been established, then a connection status is maintained. Optionally, the connection status is a trusted connection status, and the first terminal and the second terminal can send data to each other in the trusted connection status.

Particularly, for example, the communication between the first terminal and the second terminal is achieved through Bluetooth. Before a transmission of real-time motion data, it is required to first confirm whether a Bluetooth connection has been established between the two pieces of terminal equipment. If the Bluetooth connection has not been established between the first terminal and the second terminal, then the Bluetooth connection may be established first. For example, the Bluetooth connection is achieved through the account binding. Optionally, during a connection process, the system will authenticate the device (for example, through the identification code of the registered account in the system) and ensure that a valid connection can only be established between trusted equipment.

If the Bluetooth connection has been established between the first terminal and the second terminal, then it is required to maintain the connection status for data communication. In the connection status, the first terminal and the second terminal can send data to each other.

It can be understood that when the communication mode between the first terminal and the second terminal is Bluetooth, Bluetooth 4.0 and above are supported, because these versions of Bluetooth have lower energy consumption and higher transmission rate. In addition, Bluetooth is only one transmission mode between the first terminal and the second terminal. The first terminal and the second terminal in the present application may also be connected in a wireless mode through Radio Frequency Identification (RFID) or Near Field Communication (NFC). These wireless connections can not only achieve faster connection between equipment, but also achieve more accurate data transmission and control through more intelligent algorithms.

The data transmission is performed after confirming the connection status, which can ensure the reliability of data communication and improve the probability of success of the data transmission.

In addition, after the connection between the first terminal and the second terminal is disconnected, the second terminal stops displaying real-time motion information and reminds that a reconnection is required.

Optionally, the method provided in the present application also includes a step of detecting a screen projection operation of the user. The step of controlling the first terminal to send the obtained real-time motion data includes: controlling the first terminal to send the real-time motion data to the second terminal when the screen projection operation is detected.

In this embodiment, the user's active operation is also required to enable the first terminal to send the real-time motion data to the second terminal. In case that the screen projection operation of the user is detected, the first terminal will perform a screen projection action, such as sending the real-time motion data to the second terminal. The transmission of real-time motion data will consume a lot of power of the first terminal, thus, in this step, the first terminal does not send the real-time motion data in unnecessary cases (such as, in cases that the screen projection operation is not detected by the terminal system), which can reduce power consumption and reduce the use loss of the first terminal to a certain extent.

Optionally, the second terminal is controlled to generate a screen projection identifier when it is detected that the first terminal is entered the motion mode. The step of detecting the screen projection operation of the user includes: detecting whether the screen projection identifier is operated by the user; and determining that the screen projection operation is detected when the screen projection identifier is operated by the user.

Particularly, the second terminal is controlled to generate a screen projection identifier. For example, a notification is sent by the first terminal to the second terminal after the motion mode is entered by the first terminal to inform that the first terminal has entered the motion mode, and to confirm whether the screen projection needs to be performed. Then, the screen projection identifier is generated by the second terminal according to the notification, where the screen projection identifier is used for the user to confirm whether the real-time motion data needs to be projected. The generating of the screen projection identifier may include that: a personalized icon appears in the graphical user interface (GUI) when the notification is received, or alternatively, an icon representing the motion mode in the GUI appears in action when the notification is received.

In this embodiment, the screen projection operation (i.e., the function of real-time motion data transmission) is reasonably performed according to user needs, the screen projection operation is triggered only after a certain operation is performed by the user on the screen projection identifier displayed by the second terminal, which can save the power consumption of the first terminal when transmitting the real-time motion data and the power consumption of the second terminal when displaying motion data. In the meantime, the motion data will not be suddenly displayed on the second terminal at unnecessary times (non-user active operation of the screen projection identifier), so that noise interference on the display interface of the second terminal will be avoided.

Optionally, the method provided by the present application also includes steps of: generating a screen projection instruction according to the screen projection operation; and controlling the first terminal to receive the generated screen projection instruction. The step of controlling the first terminal to send the real-time motion data to the second terminal includes: controlling the first terminal to send the real-time motion data to the second terminal when the screen projection instruction is received by the first terminal.

Particularly, when the screen projection operation is detected, it is indicated that the user has the need to display the real-time motion data on the second terminal. After the screen projection operation is detected, the screen projection instruction is generated according to the screen projection operation to instruct the first terminal to send the real-time motion data to the second terminal for the user to view through the display device of the second terminal.

In this embodiment, a screen projection operation is provided to affect the first terminal initiating screen projection, that is, the real-time motion data sending action of the first terminal is triggered by the screen projection instruction generated according to the screen projection operation, which has limited the conditions for the first terminal to send the real-time motion data to the second terminal. The sending operation is performed only after the screen projection instruction is received, thereby the consumption of the first terminal caused by transmitting the real-time motion data is reduced.

Optionally, the communication mode between the first terminal and the second terminal includes a first communication mode and a second communication mode, and the method provided in the present application also includes a step of detecting whether the first terminal is required to send the real-time motion data. The step of controlling the first terminal to send the obtained real-time motion data includes: controlling the first terminal to send the obtained real-time motion data in the first communication mode when it is detected that the first terminal is required to send the real-time motion data. A data transmission frequency of the first communication mode is higher than a data transmission frequency of the second communication mode.

Particularly, between the first terminal and the second terminal, data interaction through the first communication mode (high-frequency communication mode) and the second communication mode (low-frequency communication mode) are supported. In one example, after an initial connection is established, the data interaction is first carried out through the second communication mode, that is, the low-frequency communication mode. The low-frequency communication mode usually takes a long time to complete the data transmission, but the corresponding power consumption and resource consumption are also small, which can extend the battery life and improve the system stability. In case that a transmission of the real-time motion data is required, then the data transmission mode is switched to the first communication mode (high-frequency communication mode) which can transmit the real-time motion data timely and faster and improve the user's observation experience.

In some examples, in the first communication mode, the frequency of sending the real-time motion data from the first terminal to the second terminal is equal to a screen refresh rate of the second terminal. For example: if the screen refresh rate of the second terminal is assumed to be 2 times per second (2 Hz), then in the high-frequency communication mode, the frequency of the first terminal sending the real-time motion data to the second terminal is the screen refresh rate of the second terminal, i.e., 2 Hz. This enables an update of the real-time motion data to be consistent with a refresh of the screen, thereby the second terminal can timely display the latest real-time motion data to the user when the screen refresh rate is fixed, so as to improve the user's observation experience.

Further, the first terminal may be a watch, and the second terminal may be a mobile phone, and the screen refresh rate of the mobile phone is usually 1 Hz. In this scenario, in the first communication mode, the frequency of the first terminal sending the real-time motion data to the second terminal may be 1 Hz; and in the first communication mode, the frequency of the first terminal sending data to the second terminal may be less than 1 Hz.

In some examples, the second terminal is controlled to send a request for the first communication mode to the first terminal after the screen projection operation of the user is detected. The first terminal, after receiving the request, is configured to send the real-time motion data to the second terminal through the first communication mode, and the second terminal, upon receiving the real-time motion data sent by the first terminal, is configured to display the data synchronously on the display device.

Particularly, after the first terminal is entered the motion mode, the user is enabled to access a viewing page for real-time motion data by operating the screen projection identifier generated by the second terminal. This page usually includes various data of the current exercise, historical records, exercise targets and other information. The second terminal will send a communication request of the first communication mode to the first terminal after an operation is performed on the screen projection identifier. The first terminal, in respond to this communication request, is switched to the first communication mode. In the first communication mode, the first terminal can send real-time motion data to the second terminal much faster to meet the needs of users for real-time and accurate data.

The second terminal, when receiving the real-time motion data through the first communication mode, is configured to parse and process the received data, and synchronously update the relevant information in the aforementioned viewing page for real-time motion data. The user can check his/her exercise status at any time and perform adjustments as needed.

In this embodiment, the first communication mode, that is, the high-frequency communication mode, is executed only when the real-time motion data is required to be sent. High-frequency communication can realize the real-time transmission, so that the real-time motion data can be transmitted to the second terminal much faster, which can ensure the users to view the accurate real-time motion information in time, help the users to better monitor their physical condition, improve the user's health level, and enhance the user's observation experience.

Optionally, the method provided by the present application also includes a step of controlling the first terminal to communicate with the second terminal in the second communication mode when it is detected that the first terminal is not required to send the real-time motion data.

Particularly, when it is not required to send and receive the real-time motion data, the data transmission between the first terminal and the second terminal does not have strict timeliness, thus it is possible to select the second communication mode (low-frequency communication mode) for data interaction.

In this embodiment, the daily data transmission between the first terminal and the second terminal may be in the second communication mode (low-frequency communication). In the case that the data transmission can be completed, the power consumption of the terminal for transmission is reduced, which is conducive to power management.

In some examples, the first terminal is configured, when the motion mode is ended, to automatically stop sending real-time motion data to the second terminal, simultaneously send a notification of an end of the motion mode to the second terminal, and exit the first communication mode. The second terminal, when receiving the above notification, is configured to exit a display page in the motion mode. This page may be a display page for the real-time motion data, or it may be other pages related to the current motion mode. Here, the ending of the motion mode includes the user operating the first terminal or the second terminal to end the current exercise.

Optionally, the method provided by the present application also includes a step of obtaining a category of target motion data, where the category of target motion data is at least part of a category of the real-time motion data. The step of controlling the second terminal to display the real-time motion data on the display device includes: controlling the second terminal to display the real-time motion data corresponding to the category of target motion data on the display device.

Herein, the category of real-time motion data includes: an exercise name, an exercise duration, calories burned, an exercise intensity, real-time cardiorespiratory data, planned remaining exercise time, etc. In some examples, the user is enabled to choose to display only relevant data of the category of target motion data, for example, if the category of target motion data is the exercise name and the planned remaining exercise time, then only the relevant data of the exercise name and the planned remaining exercise time are displayed on the display device of the second terminal for the user to confirm an exercise progress.

In some examples, the method provided by the present application also includes a step of obtaining a motion data category selection operation of the user. The step of obtaining the category of target motion data includes: determining the category of target motion data from the category of real-time motion data according to the motion data category selection operation.

Particularly, the user's motion data category selection operation may be obtained by the user operating on the first terminal, so that the first terminal, on the premise of functionally supporting a collection of all of the real-time motion data, is controlled to only collect the information relevant to the category of target motion data, thereby the overhead for obtaining motion data is reduced. The user's motion data category selection operation may also be obtained by the user operating the second terminal, so that the second terminal is controlled to only request the information relevant to the category of target motion data from the first terminal, thereby the overhead of the first terminal sending motion data to the second terminal can be reduced. Or the second terminal, after receiving all of the real-time motion data, is controlled to only display the information relevant to the category of target motion data, thus, the overhead of the second terminal for display is reduced.

In this embodiment, a screening of the required motion data for display is supported, which can reduce the overhead of the second terminal for display. In some cases, the overhead of the first terminal for collecting or sending motion data can also be reduced, which thus can extend the battery life of the first terminal and the second terminal, and optimize the user's experience of monitoring the real-time motion data.

Optionally, the real-time motion data includes a motion trajectory, and the method provided in the present application also includes steps of: controlling the second terminal to obtain map information; and controlling the second terminal to display the map information on the display device. The step of controlling the second terminal to display the real-time motion data on the display device includes: controlling the second terminal to superimpose the motion trajectory on the map information displayed on the display device.

Particularly, the map information includes a plane map or a three-dimensional simulation map, and the second terminal is configured to display the map information on the display device after obtaining the map information. The motion trajectory extracted from the user's real-time motion data is superimposed on the map information, so that the user can view the location in real time during the exercise, or review the motion trajectory in combination with an exercise scene after the exercise, so that the review has a certain degree of immersion which can improve the user experience. Among them, the step of obtaining map information, for example, may be preset before the exercise, or obtained from a communication-connected device such as a server during the exercise.

In addition, in case that the map information obtained is based on a three-dimensional simulation map, then a perspective conversion operation of the user may be received by the second terminal when the user views the motion trajectory superimposed on the map information through the display device, and the display device is controlled by the second terminal to display the map information and the motion trajectory superimposed on the map information at a viewing angle corresponding to the perspective conversion operation. Thus, the immersion level during the review is further improved which then enhance the user's review experience.

In this embodiment, the real-time motion data contains the motion trajectory, and the motion trajectory can be displayed in combination with a preset map, and the exercise process can be viewed in real time or can be reviewed in combination with the actual terrain or landscape, so that the user's real-time motion data can be more vividly displayed, which thus can enhance the user's viewing experience.

Optionally, the second terminal also supports recording an exercise mood. That is, on the viewing page for real-time motion data, an addition of relevant information records at this very moment is supported, the form of addition may include sound, text, pictures, videos, etc., which will not be limited here.

Particularly, on the viewing page for real-time motion data, pop-up windows may be added according to user operations, and any type of data may be added in the pop-up window to record the user's thoughts, moods or experiences in the current exercise process. It is also supported a dynamical review of the relevant content by the user in a later period.

Further, the second terminal supports first finding the motion trajectory on the viewing page for real-time motion data, adding a pop-up window or bubble at the current moment according to a position of the real-time motion trajectory, and adding relevant records in the pop-up window. After adding, the user can click on the page to view all the added content during movement, and the pop-up window or bubble will also be sorted according to the time of the record, which supports a dynamic review after the movement.

In the method for linkage transmission provided by the present application, the real-time motion data of the wearer obtained by the first terminal can be displayed through the second terminal, so that an observing user (the wearer himself or other observers) can observe the real-time motion data in certain exercise scenes, such as cycling, treadmill, elliptical machine, etc., without performing additional actions such as raising the wrist, and can confirm and monitor the exercise status according to the data, which thus improves the user's exercise experience.

Further, the first terminal is mainly configured to obtain real-time motion data, and the second terminal is mainly configured to display the real-time motion data and view and manage relevant historical records. Through the interaction between the two terminals, data synchronization and control between the wearable mobile device and the display screen can be achieved. Based on the needs of the exercise scene, the various functions and data on the terminal are adjusted according to the user's behavior pattern, so that more personalized services can be achieved.

The above describes in detail an example of the method of linkage transmission provided by the present application. It can be understood that, to achieve the above functions, the corresponding device includes hardware structures and/or software modules corresponding to various functions. It should be easy for a person skilled in the art to realize that, in combination with the units and algorithm steps of each example described in the embodiments disclosed herein, the present application may be implemented in the form of hardware or a combination of hardware and computer software. Whether a function is executed in the form of hardware or in the form of computer software driving hardware depends on the specific application and design constraints of the technical schemes. Technical professionals may use different methods for each particular application to achieve the described functions, but such implementation should not be considered beyond the scope of the present application.

The present application may divide functional units of a device for linkage transmission according to the above method embodiments. For example, various function may be divided into various functional units, or two or more functions may be integrated into one unit. The integrated unit may be implemented in the form of hardware or software functional units. It should be noted that the division of units in the present application is schematic and is only a logical function division. In actual implementation, other division manners may also be possible.

FIG. 2 is a schematic structural diagram of a device for linkage transmission provided by the present application. The device 200 includes a first processor 210 and an obtaining component 220. The obtaining component 220 is capable of performing an obtaining step under a control of the first processor 210.

The obtaining component 220 is controlled to obtain real-time motion data.

The first terminal is controlled to send the obtained real-time motion data; and the second terminal is controlled to display the real-time motion data on a display device. The second terminal is different from the first terminal.

Optionally, the device 200 is also configured to implement the following operations: obtaining a motion mode selection operation of a user; and controlling the first terminal to enter the motion mode according to the motion mode selection operation. Particularly, the processor 210 is configured to: when executing an obtaining of the real-time motion data, control the obtaining unit 220 to obtain the real-time motion data when the first terminal is detected to be entered the motion mode.

Optionally, the device 200 is also configured to implement an operation of detecting a screen projection operation of the user. Particularly, the processor 210 is configured to: when executing a control of the first terminal to send the obtained real-time motion data, control the first terminal to send the real-time motion data to the second terminal when the screen projection operation is detected.

Optionally, the device 200 is also configured to implement the following operations: generating a screen projection instruction according to the screen projection operation; and controlling the first terminal to receive the generated screen projection instruction. Particularly, the processor 210 is configured to: when executing a control of the first terminal to send the real-time motion data to the second terminal, control the first terminal to send the real-time motion data to the second terminal when the screen projection instruction is received by the first terminal.

Optionally, a communication mode between the first terminal and the second terminal includes a first communication mode and a second communication mode, and the device 200 is also configured to implement an operation of detecting whether the first terminal is required to send the real-time motion data. Particularly, the processor 210 is configured to: when executing the control of the first terminal to send the obtained real-time motion data, control the first terminal to send the obtained real-time motion data in the first communication mode when it is detected that the first terminal is required to send the real-time motion data. A data transmission frequency of the first communication mode is higher than a data transmission frequency of the second communication mode.

Optionally, the first processor 210 is also configured to implement an operation of controlling the first terminal to communicate with the second terminal in the second communication mode when it is detected that the first terminal is not required to send the real-time motion data.

Optionally, the device 200 is also configured to implement an operation of obtaining a category of target motion data; where the category of target motion data is at least part of a category of the real-time motion data. Particularly, the processor 210 is configured to: when executing a control of the second terminal to display the real-time motion data on the display device, control the second terminal to display the real-time motion data corresponding to the category of target motion data on the display device.

Optionally, the real-time motion data includes a motion trajectory, and the device 200 is also configured to implement the following operations: controlling the second terminal to obtain map information; and controlling the second terminal to display the map information on the display device. Particularly, the processor 210 is configured to: when executing the control of the second terminal to display the real-time motion data on the display device, control the second terminal to superimpose the motion trajectory on the map information displayed on the display device.

For specific manner of performing the method for linkage transmission by the device 200 and the beneficial effects produced by the device, references may be referred to the relevant description in the method embodiments.

Figure 3:
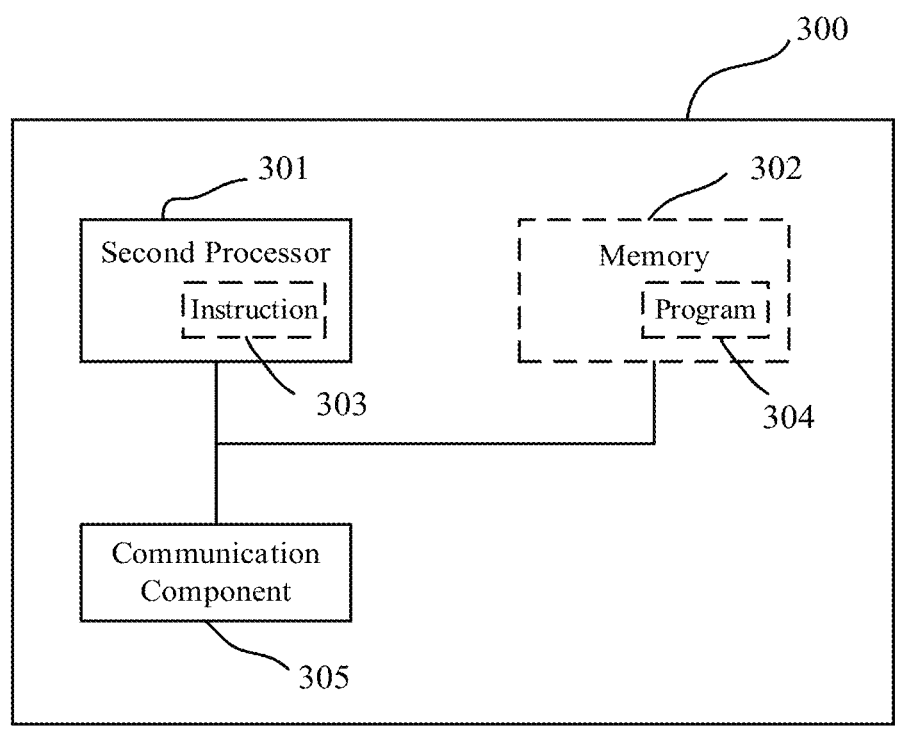
FIG. 3 is a schematic diagram of a piece of electronic equipment provided by the present application.

FIG. 3 shows a schematic structural diagram of a piece of electronic equipment for linkage transmission provided by the present application. The broken line in FIG. 3 indicates that the unit or the module is optional. Equipment 300 may be configured to implement the method described in the above method embodiment. Equipment 300 may be a piece of terminal equipment or a server or a chip.

The equipment 300 includes one or more second processors 301 which can support the equipment 300 to implement the method in the method embodiment. The second processor 301 may be a general-purpose processor or a special-purpose processor. For example, the second processor 301 may be a central processing unit (CPU), a digital signal processor (DSP), an application specific integrated circuit (ASIC), a field programmable gate array (FPGA) or other programmable logic devices, such as discrete gates, transistor logic devices or discrete hardware components.

The second processor 301 may be configured to control the equipment 300, execute software programs, and process data of software programs. The equipment 300 may also include a communication component 305 to implement signal input (reception) and output (transmission).

For example, the equipment 300 may be a chip, and the communication component 305 may be an input and/or output circuit of the chip, or the communication component 305 may be a communication interface of the chip, and the chip may be used as a component of the terminal equipment or a server or other electronic equipment.

For another example, the equipment 300 may be a piece of terminal equipment or a server, and the communication component 305 may be a transceiver of the terminal equipment or the server, or the communication component 305 may be a transceiver circuit of the terminal equipment or the server.

The equipment 300 may include one or more memories 302, on which a program 304 is stored, and the program 304 can be run by the second processor 301 to generate an instruction 303, to enable the second processor 301 to perform the method described in the above method embodiment according to the instruction 303. Optionally, data may also be stored in the memory 302. Optionally, the second processor 301 may also read the data stored in the memory 302, and the data may be stored at the same storage address as the program 304, or the data and the program 304 may be stored at a different storage address.

The second processor 301 and the memory 302 may be arranged separately or may be integrated together, for example, integrated on a system on chip (SOC) of the terminal equipment.

The present application also provides a computer program product, which when executed by the second processor 301 is configured to implement the method described in any method embodiment of the present application.

The computer program product may be stored in the memory 302, such as a program 304. The program 304, after a preprocessing, a compiling, an assembling, a linking, etc., is finally converted into an executable target file that can be executed by the second processor 301.

The present application also provides a computer-readable storage medium on which a computer program is stored. The computer program, when executed by a computer, causes the method described in any method embodiment of the present application to be implemented. The computer program may be a high-level language program or an executable target program.

The computer-readable storage medium is, for example, a memory 302. The memory 302 may be a volatile memory or a non-volatile memory, or the memory 302 may include both a volatile memory and a non-volatile memory. Among them, the non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random-access memory (RAM), which is used as an external cache. By way of example but not limitation, many forms of RAM are available, such as static RAM (SRAM), dynamic RAM (DRAM), synchronous DRAM (SDRAM), double data rate SDRAM (DDR SDRAM), enhanced SDRAM (ESDRAM), synchronous link DRAM (SLDRAM) and direct rambus RAM (DR RAM).

Persons skilled in the art can clearly understand that for the convenience and simplicity of description, references for specific working process and technical effects of the above-described devices and equipment may be made to the corresponding processes and technical effects in the aforementioned method embodiments, which will not be repeated here.

In several embodiments provided in the present application, the disclosed systems, devices and methods may be implemented in other ways. For example, some features of the above-described method embodiments may be ignored or not executed. The device embodiments described above are only schematic. The division of units is only a logical function division. There may be other division methods in actual implementation. Multiple units or components may be combined or integrated into another system. In addition, the coupling between the units or the coupling between the components may be a direct coupling or an indirect coupling, and the above coupling includes electrical, mechanical or other forms of connection.

It should be understood that in various embodiments of the present application, the sequence number of each process does not mean the order of execution. The execution order of each process should be determined by its function and internal logic, and should not constitute any limitation on the implementation process of the embodiment of the present application.

In addition, the terms "system" and "network" are often used interchangeably throughout this article. The term "and/or" in this article is only a description of the association relationship of the associated objects, indicating that there may be three relationships. For example, A and/or B may indicates that: A exists alone, both A and B are existed, and B exists alone. In addition, the character "/" in this article generally indicates that the associated objects before and after are in an "or" relationship.

In short, the above embodiments are only some preferred examples of the technical schemes of the present application, and are not intended to limit the protection scope of the present application. Any modifications, equivalent substitutions, improvements, etc. made within the spirit and principles of the present application should be included within the protection scope of the present application.

What is claimed is:

1. A method for linkage transmission, applied to a terminal system, the terminal system comprising a first terminal and a second terminal, the first terminal comprising a wearable device, the second terminal comprising a display device, and the method comprising:
   obtaining real-time motion data;
   controlling the first terminal to send obtained real-time motion data; and
   controlling the second terminal to display the real-time motion data on a display device, wherein the second terminal is different from the first terminal, and a communication mode between the first terminal and the second terminal comprises a first communication mode and a second communication mode;
controlling the first terminal to communicate with the second terminal in the second communication mode when it is detected that the first terminal is not required to send the real-time motion data; and
controlling the first terminal to send the obtained real-time motion data in the first communication mode when it is detected that the first terminal is required to send the real-time motion data,
wherein a data transmission frequency of the first communication mode is higher than a data transmission frequency of the second communication mode, and
wherein in the first communication mode, a frequency of sending the real-time motion data from the first terminal to the second terminal is equal to a screen refresh rate of the second terminal.

2. The method according to claim 1, wherein the method further comprises:
obtaining a motion mode selection operation of a user;
controlling the first terminal to enter a motion mode according to the motion mode selection operation; and
said obtaining the real-time motion data comprises:
obtaining the real-time motion data when the first terminal is detected to be entered the motion mode.

3. The method according to claim 1, wherein the method further comprises:
detecting a screen projection operation of the user; and
said controlling the first terminal to send the obtained real-time motion data comprises:
controlling the first terminal to send the real-time motion data to the second terminal when the screen projection operation is detected.

4. The method according to claim 3, wherein the method further comprises:
generating a screen projection instruction according to the screen projection operation;
controlling the first terminal to receive a screen projection instruction that is generated; and
said controlling the first terminal to send the real-time motion data to the second terminal comprises:
controlling the first terminal to send the real-time motion data to the second terminal when the screen projection instruction is received by the first terminal.

5. The method according to claim 1, wherein the method further comprises:
obtaining a category of target motion data; wherein the category of target motion data is at least part of a category of the real-time motion data; and
said controlling the second terminal to display the real-time motion data on the display device comprises:
controlling the second terminal to display the real-time motion data corresponding to the category of the target motion data on the display device.

6. The method according to claim 1, wherein the real-time motion data comprises a motion trajectory, and the method further comprises:
controlling the second terminal to obtain map information;
controlling the second terminal to display the map information on the display device; and
said controlling the second terminal to display the real-time motion data on the display device comprises:
controlling the second terminal to superimpose the motion trajectory on the map information displayed on the display device.

7. A device for linkage transmission, comprising a processor and a memory, wherein the processor is coupled with the memory, the memory is configured to store a computer program, and the computer program, when executed by the processor, causes the device to perform operations that comprise:
obtaining real-time motion data;
controlling a first terminal to send obtained real-time motion data; and
controlling a second terminal to display the real-time motion data on a display device, wherein the first terminal comprises a wearable device, the second terminal comprises the display device, the second terminal is different from the first terminal, and a communication mode between the first terminal and the second terminal comprises a first communication mode and a second communication mode;
controlling the first terminal to communicate with the second terminal in the second communication mode when it is detected that the first terminal is not required to send the real-time motion data; and
controlling the first terminal to send the obtained real-time motion data in the first communication mode when it is detected that the first terminal is required to send the real-time motion data,
wherein a data transmission frequency of the first communication mode is higher than a data transmission frequency of the second communication mode, and
wherein in the first communication mode, a frequency of sending the real-time motion data from the first terminal to the second terminal is equal to a screen refresh rate of the second terminal.

8. The device for linkage transmission according to claim 7, wherein the operations further comprise:
obtaining a motion mode selection operation of a user;
controlling the first terminal to enter a motion mode according to the motion mode selection operation; and
the operation of obtaining the real-time motion data comprises:
obtaining the real-time motion data when the first terminal is detected to be entered the motion mode.

9. The device for linkage transmission according to claim 7, wherein the operations further comprise:
detecting a screen projection operation of the user; and
the operation of controlling the first terminal to send the obtained real-time motion data comprises:
controlling the first terminal to send the real-time motion data to the second terminal when the screen projection operation is detected.

10. The device for linkage transmission according to claim 9, wherein the operations further comprise:
generating a screen projection instruction according to the screen projection operation;
controlling the first terminal to receive a screen projection instruction that is generated; and
the operation of controlling the first terminal to send the real-time motion data to the second terminal comprises:
controlling the first terminal to send the real-time motion data to the second terminal when the screen projection instruction is received by the first terminal.

11. The device for linkage transmission according to claim 7, wherein the operations further comprise:
obtaining a category of target motion data; wherein the category of target motion data is at least part of a category of the real-time motion data; and the operation of controlling the second terminal to display the real-time motion data on the display device comprises:
    controlling the second terminal to display the real-time motion data corresponding to the category of the target motion data on the display device.

12. The device for linkage transmission according to claim 7, wherein the real-time motion data comprises a motion trajectory, and the operations further comprise:
    controlling the second terminal to obtain map information;
    controlling the second terminal to display the map information on the display device; and
    the operation of controlling the second terminal to display the real-time motion data on the display device comprises:
        controlling the second terminal to superimpose the motion trajectory on the map information displayed on the display device.

13. A non-transitory computer-readable storage medium in which a computer program is stored, wherein the computer program, when executed by a processor, enables the processor to perform operations that comprise:
    obtaining real-time motion data;
    controlling a first terminal to send obtained real-time motion data; and
    controlling a second terminal to display the real-time motion data on a display device, wherein the first terminal comprises a wearable device, the second terminal comprises the display device, the second terminal is different from the first terminal, and a communication mode between the first terminal and the second terminal comprises a first communication mode and a second communication mode;
    controlling the first terminal to communicate with the second terminal in the second communication mode when it is detected that the first terminal is not required to send the real-time motion data; and
    controlling the first terminal to send the obtained real-time motion data in the first communication mode when it is detected that the first terminal is required to send the real-time motion data,
    wherein a data transmission frequency of the first communication mode is higher than a data transmission frequency of the second communication mode, and
    wherein in the first communication mode, a frequency of sending the real-time motion data from the first terminal to the second terminal is equal to a screen refresh rate of the second terminal.

14. The non-transitory computer-readable storage medium according to claim 13, wherein the operations further comprise:
    obtaining a motion mode selection operation of a user;
    controlling the first terminal to enter a motion mode according to the motion mode selection operation; and
    the operation of obtaining the real-time motion data comprises:
        obtaining the real-time motion data when the first terminal is detected to be entered the motion mode.

15. The non-transitory computer-readable storage medium according to claim 13, wherein the operations further comprise:
    detecting a screen projection operation of the user; and
    the operation of controlling the first terminal to send the obtained real-time motion data comprises:
        controlling the first terminal to send the real-time motion data to the second terminal when the screen projection operation is detected.

16. The non-transitory computer-readable storage medium according to claim 15, wherein the operations further comprise:
    generating a screen projection instruction according to the screen projection operation;
    controlling the first terminal to receive a screen projection instruction that is generated; and
    the operation of controlling the first terminal to send the real-time motion data to the second terminal comprises:
        controlling the first terminal to send the real-time motion data to the second terminal when the screen projection instruction is received by the first terminal.

* * * * *